(12) United States Patent
Szalony et al.

(10) Patent No.: US 6,623,396 B2
(45) Date of Patent: Sep. 23, 2003

(54) DIFFERENTIAL GEAR ASSEMBLY

(75) Inventors: Norman Szalony, Brighton, MI (US); Richard Krzesicki, Ann Arbor, MI (US); John Rutt, Macomb Township, MI (US); Brian Orr, Macomb, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/062,009

(22) Filed: Jan. 31, 2002

(65) Prior Publication Data

US 2003/0144106 A1 Jul. 31, 2003

(51) Int. Cl.⁷ ............................................. F16H 48/08
(52) U.S. Cl. .................................... 475/230; 475/901
(58) Field of Search ............................... 475/220, 230, 475/231, 336, 901

(56) References Cited

U.S. PATENT DOCUMENTS

| | | | | |
|---|---|---|---|---|
| 696,704 A | * | 4/1902 | Allen | 475/230 |
| 1,279,670 A | * | 9/1918 | Denning | 475/230 |
| 1,657,091 A | * | 1/1928 | Morgan | 475/230 |
| 1,834,407 A | * | 12/1931 | Grande | 475/230 |
| 1,987,716 A | * | 1/1935 | Skelton | 475/230 |
| 3,675,459 A | | 7/1972 | Dohmann | |
| 3,741,343 A | | 6/1973 | Lindenfeld et al. | |
| 3,874,251 A | | 4/1975 | Lapitsky et al. | |
| 4,125,026 A | | 11/1978 | Torli et al. | |
| 4,480,501 A | * | 11/1984 | Von Kaler | 475/230 |
| 4,688,962 A | | 8/1987 | Koltookian | 403/408.1 |
| 4,754,661 A | | 7/1988 | Barnett | |
| 4,949,456 A | * | 8/1990 | Kovach et al. | 29/893.35 |
| 5,480,360 A | * | 1/1996 | Patzer et al. | 475/230 |
| 5,520,589 A | | 5/1996 | Dewald et al. | 475/231 |
| 5,984,822 A | * | 11/1999 | Schreier et al. | 475/230 |
| 6,056,663 A | * | 5/2000 | Fett | 475/231 |
| 6,152,846 A | * | 11/2000 | Schreier et al. | 475/230 |
| 6,254,505 B1 | * | 7/2001 | Forrest | 475/230 |
| 6,315,841 B1 | * | 11/2001 | Fisher et al. | 148/328 |

* cited by examiner

*Primary Examiner*—Sherry Estremsky
(74) *Attorney, Agent, or Firm*—Brinks Hofer Gilson & Lione

(57) ABSTRACT

A differential gear assembly including a differential housing. A pair of side gears substantially axially aligned and spaced apart from each other, wherein the side gears are adapted to be supported by the differential housing and to engage axle shafts. A pair of pinion gears substantially axially aligned and spaced apart from each other, wherein the pinion gears are adapted to engage the side gears. A ring gear is mounted externally to the differential housing and a pinion pin engages and extends diametrically across the ring gear. The ring gear includes features adapted to receive the ends of the pinion pin and to position the pinion pin relative to the ring gear such that a center of mass of the ring gear is aligned with a center of mass of the pinion pin.

11 Claims, 3 Drawing Sheets

DIFFERENTIAL GEAR ASSEMBLY

BACKGROUND OF THE INVENTION

1. Technical Field of the Invention

The present invention generally relates to a differential gear assembly wherein a pinion pin is supported within a differential housing such that the differential housing can be made lighter. More specifically, the present invention relates to a differential gear assembly wherein the pinion pin is supported directly by a ring gear and positioned relative to the ring gear such that it has potential for the center of mass of the ring gear to be aligned with the center of mass of the pinion pin to substantially laterally balance the differential gear assembly, to the ring gear.

2. Description of the Prior Art

In an automotive vehicle, a differential gear assembly is used to transfer power from a rotating driveshaft to the axles and wheels of the vehicle. The rotating driveshaft of the vehicle engages a ring gear which is mounted onto a differential housing. The end of the driveshaft and the ring gear are adapted to transfer rotation from the drive shaft to the differential housing such that the differential housing rotates transverse to the driveshaft. Within the differential housing, the ends of the axles of the vehicle are supported and connected to the differential housing through a differential gear set, such as a bevel differential gear set. Thus, the ring gear of the differential housing allows the driveshaft to rotate the differential housing in a direction transverse to the driveshaft, whereby the differential gear set rotates the axles of the vehicle to drive the wheels of the vehicle.

Typically the differential gear set includes a pair of side gears which are attached directly to the axles, and a pair of pinion gears which interconnect the side gears. Most commonly, the pinion gears are supported by a pinion pin which extends across the differential housing. The pinion gears are allowed to rotate on the pinion pin thereby allowing the vehicle axles to rotate relative to one another. The rotational load is transferred from the driveshaft, to the ring gear, through the differential housing and to the pinion pin. Therefore, the differential housing must be large and thick so as to support the load being transferred therethrough. Additionally, in most conventional differential gear assemblies, the centroid (center of mass) of the ring gear is not aligned with the centroid of the pinion pin, thereby causing an unpredictable tipping moment along the axis of the axles. This tipping moment causes NVH (Noise, Vibration, Harshness), durability, and efficiency degradation.

As seen from the above, there is a need to improve the structural integrity of a differential gear assembly while also decreasing weight.

It is therefore an object of this invention to provide a differential gear assembly with a differential housing and a ring gear having features which allow the pinion pin to be attached directly to the ring gear, thereby removing the differential housing from the load path and allowing the differential housing to be designed with less structural size and weight.

Additionally, it is a further object of the present invention to provide a differential gear assembly wherein the center of mass of the ring gear is aligned with the center of mass of the pinion pin to reduce the tipping moment (lateral unbalance) along the axis of the axles.

SUMMARY OF THE INVENTION

The disadvantages of the prior art are overcome by providing a differential gear assembly, in accordance with the present invention, in which the pinion gear is attached directly to the ring gear, thereby removing the differential housing from the load path.

In one aspect of the present invention, the differential gear assembly includes a pinion pin secured to and extending diametrically across the ring gear. The ring gear includes features that receive the ends of the pinion pin and to position the pinion pin relative to the ring gear such that the center of mass of the ring gear is aligned with the center of mass of the pinion pin.

In another aspect of the present invention, the pinion pin is secured to the ring gear by the differential housing.

In still another aspect of the present invention, the pinion pin is secured to the ring gear by threaded fasteners.

DETAILED DESCRIPTION OF THE PREFERRED EMBODIMENTS

Figure 1:
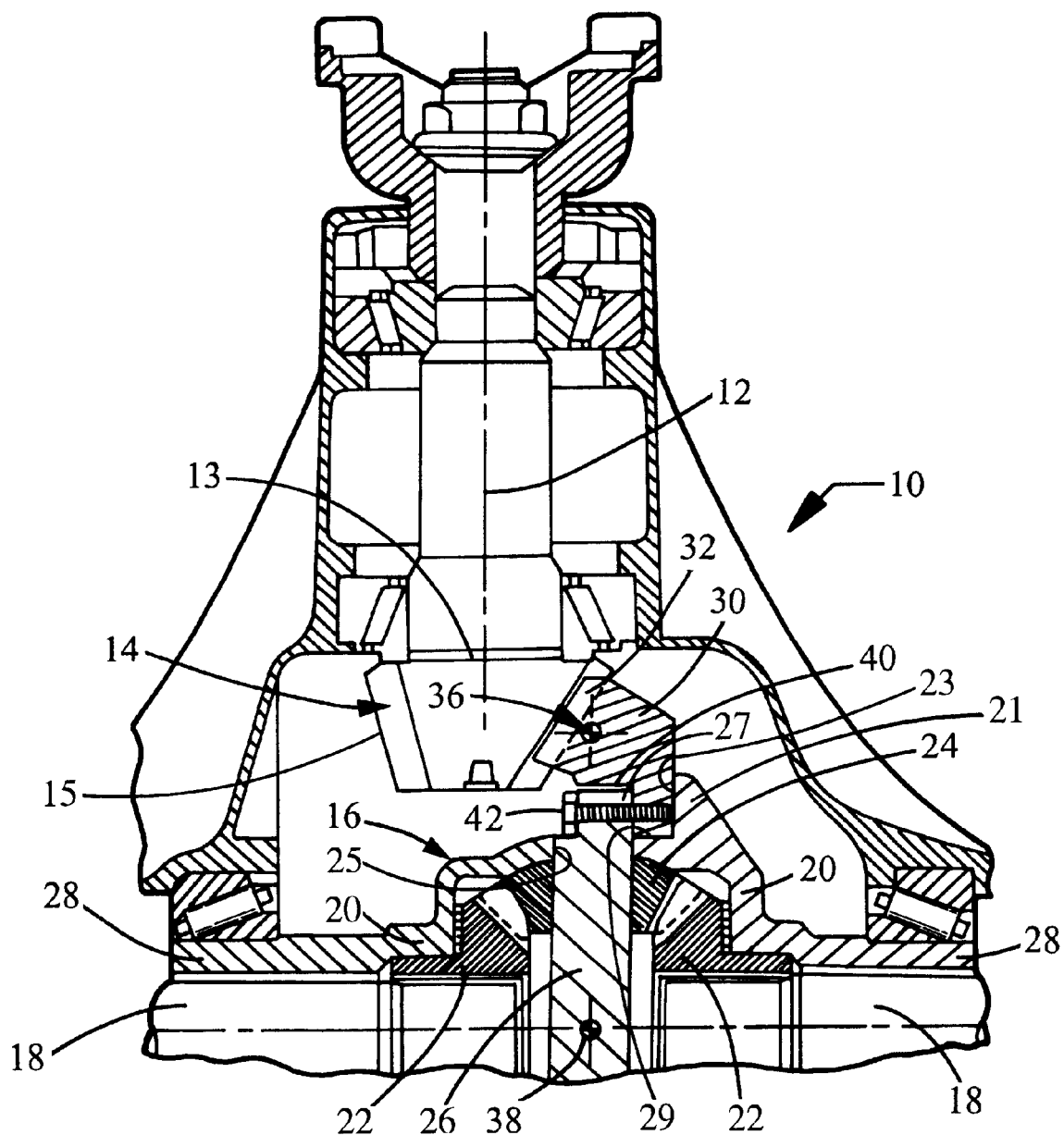
FIG. 1 is a partial sectional view of a differential assembly of the present invention shown in association with a driveshaft.

A differential assembly according to the principles of the present invention is shown generally at 10 in FIG. 1. The differential assembly 10 coupled to a drive-shaft 12 which transfers rotational power from the engine of the vehicle to the differential assembly 10. Mounted at an end 13 of the drive shaft 12 is a bevel gear 14. The gear 14 is adapted to engage a differential gear assembly 16.

In FIG. 1, only half of the differential gear set 16 is illustrated. The non-illustrated half is, however, a mirror image of the illustrated half. Accordingly, the full construction of the differential gear set 16 need not be shown since one skilled in the field will readily appreciate that full construction.

The differential gear assembly 16 generally includes a differential housing 20 and a pair of side gears 22 that are substantially axially aligned with and spaced apart from each other, while being supported within the differential housing 20. Each of the side gears 22 is attached to an end of an axle half-shaft 18 of the vehicle. A pair of pinion gears 24 (one shown), which are substantially axially aligned with and spaced apart from each other, are supported within the differential housing 20. Each of the pinion gears 24 engages the side gears 22. The pinion gears 24 are rotatably mounted on a pinion pin 26 that is supported so as to rotate with the differential housing 20.

The differential housing 20 includes a pair of extending neck portions 28, each of which is adapted to rotatably support a proximal end of one of the axle half-shafts 18. The distal ends of the axle half-shafts 18 are individually connected to a wheel of the vehicle. Non-rotatably mounted to the proximal end of each of the axle half-shafts 18 is one of the side gears 22, which in turn engage with the pinion gears 24. As such, rotation of the differential housing 20 is transferred through the pinion gears 24, to the side gears 22 and thereby to the axle half-shafts 18, all while allowing the axle half-shafts 18 to rotate relative to one another.

The differential housing 20 also includes a flange 21 extending radially outward therefrom the flange 21 defines a lateral face 23 that provides a lateral support for the ring gear 30 when the ring gear 30 is mounted to the housing 20.

A ring gear 30 is mounted externally to the differential housing 20. The ring gear 30 is generally annularly shaped having a plurality of circumferentially spaced teeth 32 extending angularly from a side face of the ring gear 30. The teeth 32 are adapted to provide smooth engagement with corresponding teeth 15 on the gear 14 of the drive shaft 12 of the vehicle.

The differential gear assembly 16 also includes the pinion pin 26 mentioned above, which is adapted to rotatably support the pinion gears 24 in engagement with the side gears 22. The pinion gears 24 may be supported on the pinion pin 26 in any suitable manner, such that the pinion gears 24 can freely rotate about the pinion pin 26. However, one method of supporting the pinion gears 24 on the pinion pin 34 26 is described in U.S. patent application Ser. No. 09/967,257, filed on September 28, 2001 (attorney docket no. 10541-585/V200-0920) entitled "Differential Gear Retention System" which is assigned to the assignee of the present application and is hereby incorporated by reference into the present application.

The pinion pin 26 extends across the diameter of the housing 20 and through aligned and opposed bores 25 in the housing 20. The bores 25 themselves are located adjacent to the flange 21, on the same side as face 23 thereof. A portion of the pinion pin 26 extends beyond the housing 20 and partially across the ring gear 30. In this manner, the pinion pin 26 is directly supported by the ring gear 30 instead of the differential housing 20. The load from the drive-shaft 12 is therefore transferred directly from the ring gear 30 to the pinion pin 26, rather than through the differential housing 20 to the pinion pin 26. Preferably, the ring gear 30 and the pinion pin 26 are formed from hardened steel, however it is to be understood that other materials with similar hardness and strength properties could be used with substantially equal results.

The ring gear 30 includes features which receive the ends of the pinion pin 26 and position the pinion pin 26 relative to the ring gear 30. Positioning such that a center of mass 36 of the ring gear 30 is aligned with a center of mass 38 of the pinion pin 26. This centroidal alignment of the ring gear 30 and the pinion pin 26 balances the differential gear assembly 16, thereby substantially reducing the tipping moment (lateral unbalance) experienced when the ring gear is not aligned with the pinion pin 26.

Figure 2:
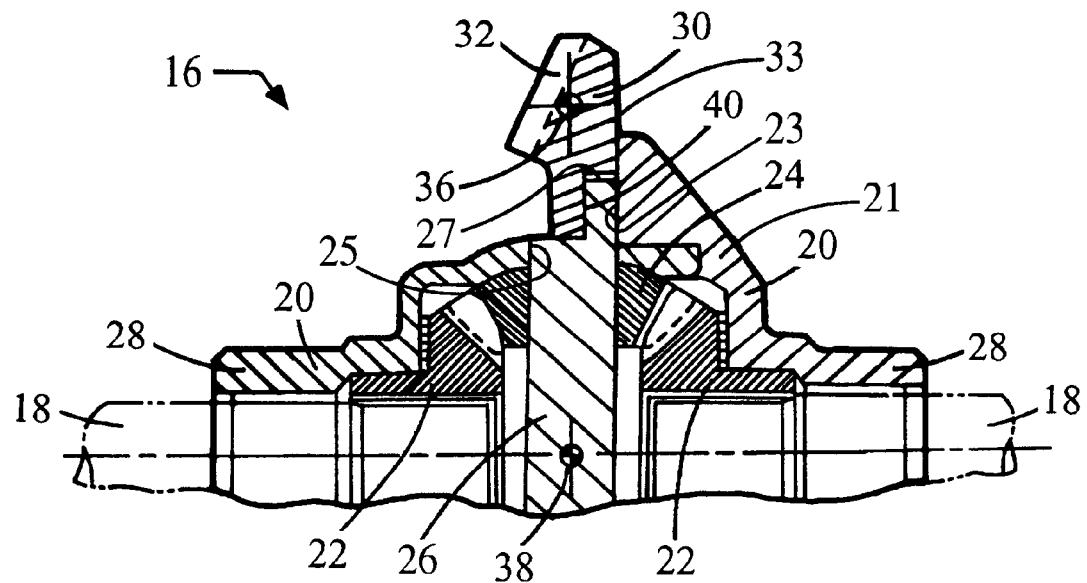
FIG. 2 is a partial sectional view of a first preferred embodiment of the differential gear assembly of the present invention.

In a preferred embodiment, as shown in FIG. 2, the ring gear 30 includes a pair of recesses 40 which receive the ends of the pinion pin 26. The recesses 40 are located adjacent to the inner diameter of the ring gear 30 and are formed only in one side face 33 of the ring gear 30. The face 33 is specifically that side of the ring gear 30 adjacent to the radial flange 21 and face 23 of the differential housing 20. The pinion pin 26 is secured within the recesses 40 as a result of the extensions 27 being trapped within the recesses 40, between the ring gear 30 and the face 23 of the flange 21 of the differential housing 20, when the ring gear 30 is mounted (via a press fit engagement) to the differential housing 20.

Figure 3:
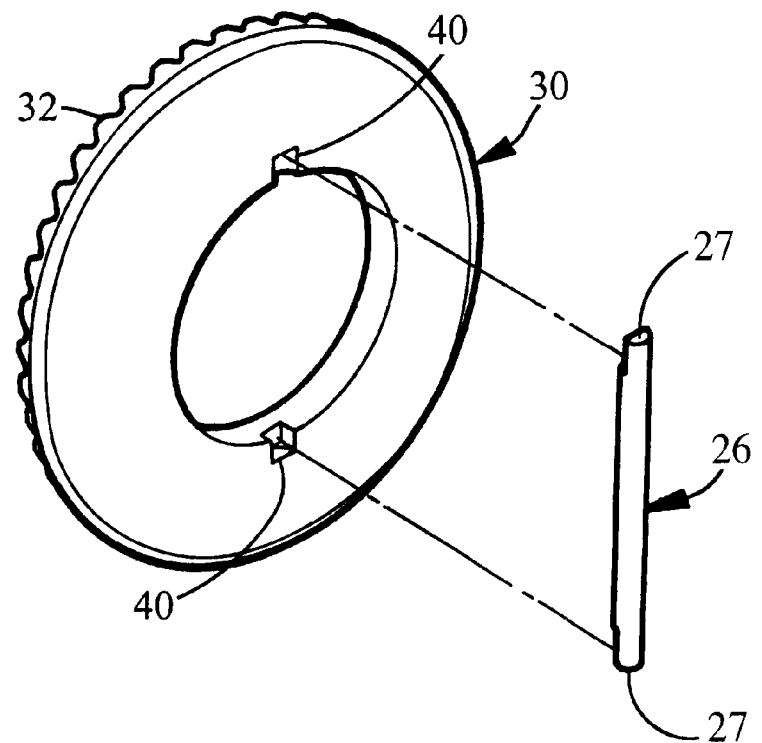
FIG. 3 is a partial exploded view of the ring gear and pinion pin of the first preferred embodiment showing how the pinion pin engages the ring gear.

This interaction between the recess 40 of the ring hear 30, the extensions 27 of the pinion pin 26 and the flange 21 of the differential housing 20 also operates to prevent rotation of the ring gear 30 relative to the housing 20. FIG. 3 illustrates how the pinion pin 34 26 fits within the recesses 40 prior to the ring gear 30 being placed to the differential housing 20.

Figure 4:
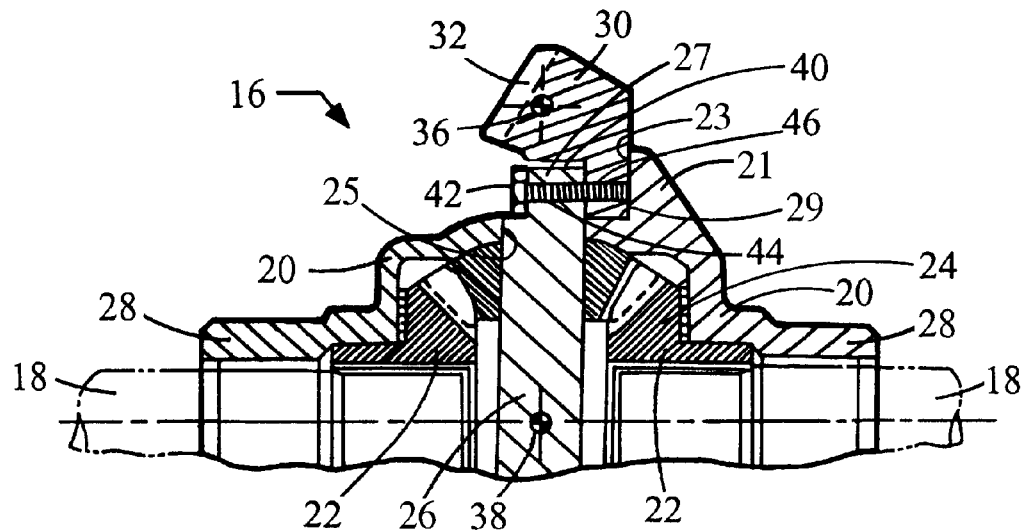
FIG. 4 is a partial sectional view of a second preferred embodiment of the differential gear assembly of the present invention.
Figure 5:
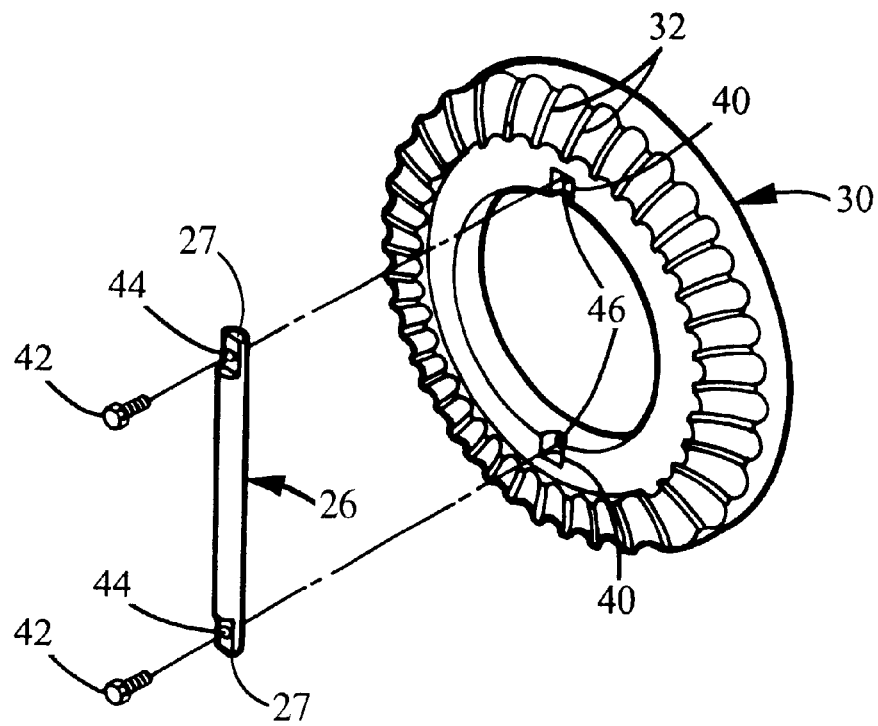
FIG. 5 is a partial exploded view of the ring gear and pinion pin of the second preferred embodiment showing how the pinion pin engages the ring gear.

Alternatively, the pinion pin 26 can be secured to the ring gear 30 by a pair of fasteners 42, as shown in the preferred embodiment of FIGS. 1, 4 and 5. The construction of this embodiment is similar to that seen and discussed above, except the pinion pin 26 is not trapped between the ring gear 30 and the flange 21. Rather, the ring gear 30 itself engages the face 23 of the flange 21 (as well as a support surface 29 of the differential housing 20) and the pinion pin 26 is bolted to the ring gear 30.

Preferably, each extension 27 of the pinion pin 26 includes a smooth hole 44 for receiving a fastener or bolt 42 therethrough. Each recess 40 preferably includes a threaded hole 46. When the ring gear 30 is placed to the pinion pin 26, the threaded fastener 42 is inserted through the smooth holes 44 and engaged with the threaded holes 46 within each of the recesses 40, securing the pinion pin 26 to the ring gear 30.

While, the pinion pin 26 is illustrated as being held to the ring gear 30 by a threaded fastener, it is to be understood, that other methods of attaching the pinion pin 26 to the ring gear 30 can be envisioned, such as using alternative fasteners or pins or methods such as welding.

The foregoing discussion discloses and describes two preferred embodiments of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

What is claimed is:

1. A differential gear assembly comprising:

a differential housing;

a pair of side gears substantially axially aligned and spaced apart from each other, each of said side gears being supported by said differential housing and adapted to engage an axle half-shaft;

a pair of pinion gears substantially axially aligned and spaced apart from each other, each of said pinion gears engaging said side gears;

a ring gear mounted externally to said differential housing; and a pinion pin secured to and extending diametrically across differential housing and said ring gear, said pinion pin supporting said pinion gears in engagement with said side gears and allowing rotational movement of said pinion gears about said pinion pin; and said ring gear including a pair of recesses adapted to receive ends of said pinion pin, said ends of said pinion pin being secured within said recesses by fasteners whereby load is transferred from said ring gear directly to said pinion pin.

2. The differential gear assembly of claim 1 wherein said pinion pin includes a pair of smooth holes, one of said smooth holes being formed at each of said ends of said pinion pin and adapted to receive one of said fasteners therethrough.

3. The differential gear assembly of claim 2 wherein said ring gear includes a plurality of threaded holes, one of said holes being formed within each of said recesses and adapted to engage one of said fasteners.

4. The differential gear assembly of claim 3 wherein said fasteners are threaded fasteners, whereby one of said threaded fasteners is inserted through each of said smooth holes and engages one of said threaded holes to secure said pinion pin to said ring gear.

5. The differential gear assembly of claim 1 wherein said pinion pin and said ring gear are formed from hardened steel.

6. A differential gear assembly comprising:

a differential housing;

a pair of side gears substantially axially aligned and spaced apart from each other, each of said side gears being supported by said differential housing and adapted to engage an axle half-shaft;

a pair of pinion gears substantially axially aligned and spaced apart from each other, each of said pinion gears engaging said side gears;

a ring gear mounted externally to said differential housing and defining a first center of mass; and a pinion pin defining a second center of mass, secured to and extending diametrically across differential housing and said ring gear, said pinion pin supporting said pinion gears in engagement with said side gears and allowing rotational movement of said pinion gears about said pinion pin; and said ring gear including features adapted to engage and receive ends of said pinion pin whereby load is transferred from said ring gear directly to said pinion pin and to position said pinion pin relative to said ring gear such that said first center of mass of said ring gear is aligned with said second center of mass of said pinion pin.

7. The differential gear assembly of claim 6 wherein said pinion pin and said ring gear are formed from hardened steel.

8. A differential gear assembly comprising:

a differential housing;

a pair of side gears substantially axially aligned and spaced apart from each other, said side gears being supported by said differential housing and adapted to engage an axle shaft;

a pair of pinion gears substantially axially aligned and spaced apart from each other, said pinion gears engaging said side gears;

a pinion pin supporting said pinion gears in engagement with said side gears and allowing rotational movement of said pinion gears about said pinion pin, said pinion pin extending across and through said differential housing and including portions extending radially beyond said differential housing; and a ring gear mounted externally to said differential housing, said ring gear including a pair of recesses adapted to receive said portions of said pinion pin and to position said pinion pin relative to said ring gear such that a center of mass of said ring gear is aligned with a center of mass of said pinion pin;

said portions of pinion pin being retained within said recesses by entrapment between said differential housing and said ring gear.

9. A differential gear assembly comprising:

a differential housing;

a pair of side gears substantially axially aligned and spaced apart from each other, said side gears being supported by said differential housing and adapted to engage an axle shaft;

a pair of pinion gears substantially axially aligned and spaced apart from each other, said pinion gears engaging said side gears;

a pinion pin supporting said pinion gears in engagement with said side gears and allowing rotational movement of said pinion gears about said pinion pin, said pinion pin extending across and through said differential housing and including portions extending radially beyond said differential housing;

a ring gear mounted externally to said differential housing, said ring gear including a pair of recesses adapted to receive said portions of said pinion pin and to position said pinion pin relative to said ring gear such that a center of mass of said ring gear is aligned with a center of mass of said pinion pin; and said ring gear further including a threaded hole formed within each of said recesses and said pinion pin including a hole formed at each of said portions, said portions of said pinion pin being retained within said recesses of said ring gear by threaded fasteners extending through said holes and engaging said threaded holes of said ring gear.

10. A differential gear assembly comprising:

a differential housing;

a pair of side gears substantially axially aligned and spaced apart from each other, each of said side gears being supported by said differential housing and adapted to engage an axle half-shaft;

a pair of pinion gears substantially axially aligned and spaced apart from each other, each of said pinion gears engaging said side gears;

a ring gear mounted externally to said differential housing; and a pinion pin secured to and extending diametrically across differential housing and said ring gear, said pinion pin supporting said pinion gears in engagement with said side gears and allowing rotational movement of said pinion gears about said pinion pin;

said ring gear including a pair of recesses adapted to receive the ends of said pinion pin whereby load is transferred from said ring gear directly to said pinion pin; said ends of said pinion pin being retained within said recesses by being trapped between said differential housing and said ring gear.

11. The differential gear assembly of claim 10 wherein said pinion pin and said ring gear are formed from hardened steel.

* * * * *